United States Patent
Scott et al.

(10) Patent No.: US 6,466,579 B1
(45) Date of Patent: *Oct. 15, 2002

(54) BI-MODAL CONTROL SYSTEM AND METHOD FOR PARTITIONING A SHARED OUTPUT BUFFER IN A CONNECTION-ORIENTED NETWORK CONNECTIONS DEVICE

(75) Inventors: James P. Scott, Hollywood; Edward G. Cavasian, San Carlos, both of CA (US)

(73) Assignee: Network Equipment Technologies Inc., Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,904

(22) Filed: May 28, 1999

(51) Int. Cl.$^7$ .......................... H04L 12/50; H04Q 11/00
(52) U.S. Cl. ..................... 370/395.71; 370/417; 710/52
(58) Field of Search ................................ 370/412, 413, 370/414, 415, 416, 417, 418, 428, 429, 395.71, 236, 395.1, 395.7; 710/52, 53, 54, 55, 56, 57

(56) References Cited

U.S. PATENT DOCUMENTS

| 5,517,495 A | * 5/1996 | Lund et al. ................. 370/412 |
| 5,588,138 A | * 12/1996 | Bai et al. ............... 395/497.04 |

FOREIGN PATENT DOCUMENTS

| EP | 0 526 104 A | 2/1999 |
| GB | 2 328 593 A | 2/1999 |

OTHER PUBLICATIONS

Bromirski M. et al., "Prioritized State–Dependent Buffer –Management Schemes In ATM Switch", Annual Military Communications Conference, US, New York, NY, IEEE Nov. 3, 1997, pp. 460–464.

* cited by examiner

Primary Examiner—Ajit Patel
(74) Attorney, Agent, or Firm—Townsend and Townsend and Crew LLP

(57) ABSTRACT

A bi-modal network connection device provides a high level of adaptability to changing connection-level loading patterns without sacrificing speed and configurability. The device can function in both a static mode and a traffic-adaptive mode. Benefits include the ability to provide high buffer utilization and throughput in ATM networks which either have very dynamic connection-level statistics or have poorly understood traffic characterization, plus the ability to assure users of minimal latency delays if desired.

2 Claims, 2 Drawing Sheets

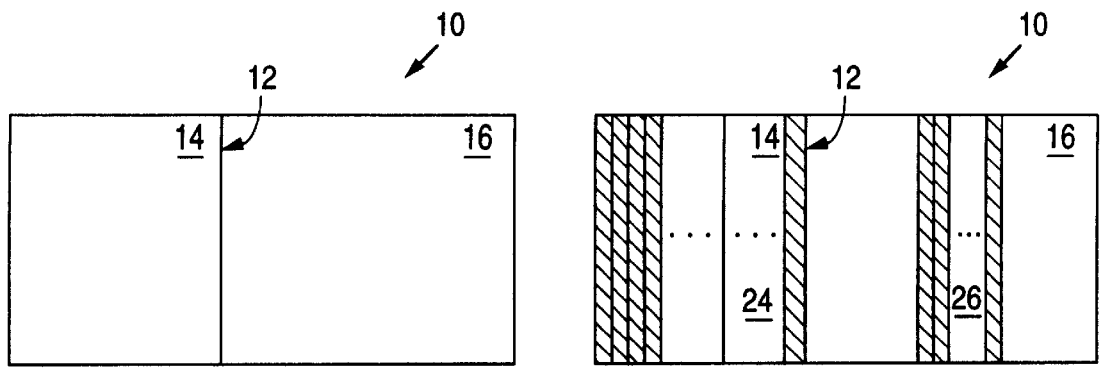
FIG. 1
FIG. 2
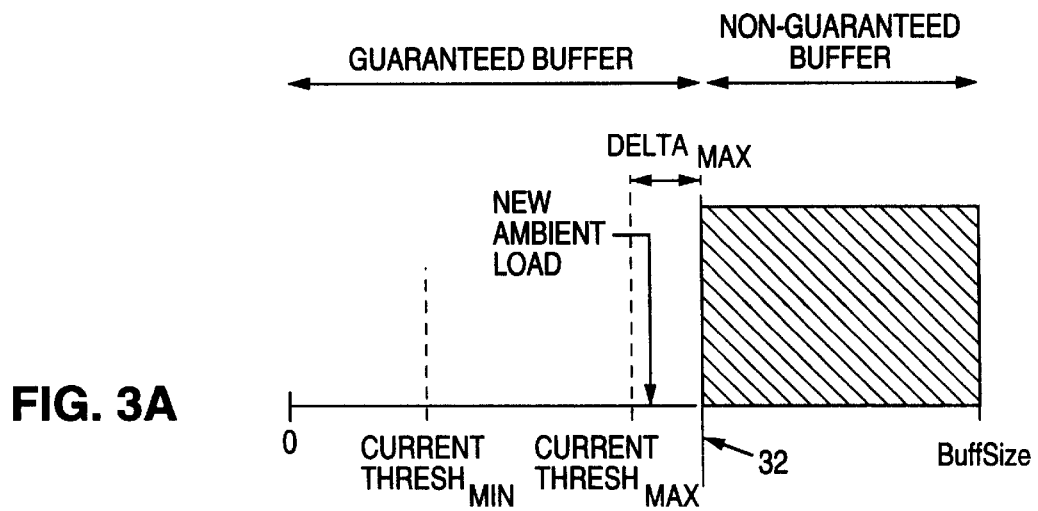
FIG. 3A
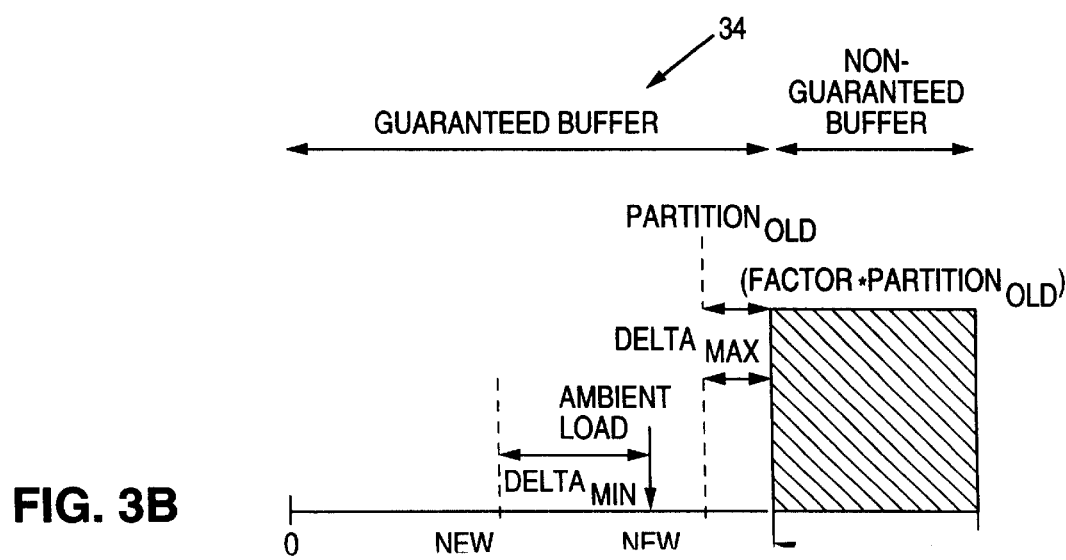
FIG. 3B

BI-MODAL CONTROL SYSTEM AND METHOD FOR PARTITIONING A SHARED OUTPUT BUFFER IN A CONNECTION-ORIENTED NETWORK CONNECTIONS DEVICE

BACKGROUND OF THE INVENTION

1. Field of the Invention

The present invention relates generally to the field of hardware and software for computer network communications, and more specifically to the field of buffering the data involved in network connections, particularly in asynchronous transfer mode (ATM) switches or any other fast network environment.

2. Description of the Background Art

Network communication systems interconnect many users in a network. Each user is connected to the network at a port. The network is formed by the interconnection of many nodes where information input at an input port from one user at a source is passed from node to node through the network to an output port and to another user at a destination. The information transferred from source to destination is packetized and each node switches incoming packets at incoming ports to outgoing packets at outgoing ports.

Fast packet switches at the nodes may transfer hundreds of thousands of packets per second at every switch port. Switch sizes range from a few ports to thousands of ports. The term "fast packet switch" includes switches capable of handling both variable-length packets and fixed-length packets. Fixed-length packets are desirable since they simplify the switch design. Fast packet switches using short, fixed-length packets (cells) are referred to as asynchronous transfer mode (ATM) switches. Fast packet switches handle different types of communications services in a single integrated network where such services may include voice, video and data communications. Since voice and video services can tolerate only a limited amount of delay and delay variance through a network, ATM switches are especially suitable for such services. The ATM standard for broadband networks defines a cell having a length of 53 bytes with a header of 5 bytes and data of 48 bytes.

In a typical ATM switch, the cell processing functions are performed within the nodes of a network. Each node is an ATM switch, which includes input controllers, a switch fabric, output controllers and a node control. The node control is used for functions including connection establishment and release, bandwidth reservation, congestion control, maintenance and network management.

Cell arrivals in an ATM switch are not scheduled. Typically, a number of cells may arrive simultaneously at different input ports each requesting the same output port. Operations in which requests exceeding the output capacity of the output port are referred to as output contention (or conflict). Since an output port can only transmit a fixed number of cells at a time, only the fixed number of cells can be accepted for transmission, so that any other cells routed to that port must either be discarded or buffered in a queue. When the traffic load exceeds the available system resources at a switch, connections are refused, performance degrades, and congestion results.

Congestion can be brought about by several factors. If nodes in a network are too slow to perform the various tasks required of them (queuing-buffers, updating tables, etc.), queues build up, even though excess line capacity exists. If a node does not have sufficient buffer resource to support the estimated load of a pending call, the node will block the call. One available congestion control technique to address this problem is that of preallocating resources. When a channel is set up (commonly referred to as a "virtual" channel, since the set up is only planned until the data is actually forwarded), a call request travels through the network making table entries at each node that controls the route to be followed by subsequent traffic. In preallocating, each call request reserves one or more data buffers in each node unless all the buffers are already reserved. If all buffers are reserved, another route is found or a "busy signal" is returned to the source. If buffers are reserved for each channel in each node, there is always a place to store any incoming packet to that node. One problem with preallocation is that substantial buffer resources are allocated to specific virtual channel connections, regardless of whether there is any traffic over the virtual channel. An inefficient use of resources results, particularly for buffer resources, since resources not being used by the connection to which they are allocated are nevertheless unavailable to other virtual channels.

This problem is exacerbated in ATM networks due to the required data type characteristics. The ATM Forum Traffic Management Specification, version 4.0 [ATMF96b, af-tm-0056.000, April, 1996, incorporated herein by reference), defines five service categories: Constant Bit Rate ("CBR"), Variable Bit Rate realtime ("VBRrt"), Variable Bit Rate non-realtime ("VBRnrt"), Unspecified Bit Rate ("UBR"), and Available Bit Rate ("ABR").

The CBR service category, which resembles leased-line services, is used for connections needing a static amount of bandwidth continuously throughout the connection. CBR is characterized by its Peak Cell Rate (PCR). Typical applications include voice and video, including videoconferencing and audio/video distribution and retrieval (television, distance learning, pay-per-view, video-on-demand, and audio library). CBR uses a static amount of bandwidth continuously throughout the life of the connection.

The VBRrt service category supplies tightly constrained delay and delay variation, but not necessarily a fixed transmission rate. VBRrt connections are characterized by their PCR, Sustained Cell Rate (SCR), and Maximum Burst Size (MBS). Applications include native ATM voice with bandwidth compression and silence suppression, and some types of multimedia communications.

The VBRnrt service category is intended for non-realtime bursty traffic that requires service guarantees, such as frame relay traffic. Like VBRrt, VBRnrt connections are also characterized in terms of PCR, SCR and MBS. Typical applications include loss-sensitive/delay-insensitive transaction processing (airline reservations, banking transactions, process monitoring) and frame relay internetworking.

The UBR service category, sometimes referred to as a best-effort service, is intended for non-realtime, bursty applications. These include text, data, and image transfer, which are tolerant to delay and loss, including telecommuting, email, and supercomputer applications such as remote procedure calls, distributed file services, and computer process swapping and paging. Other examples include LAN emulation and applications such as LAN interconnecting and internetworking—which run over router-based protocols like Transmission Control Protocol/Internet The ABR service category provides a Minimum Cell Rate (MCR) plus any available bandwidth. ABR connections are characterized by both a PCR and an MCR, and are used by applications that can adapt to network feedback. A flow-control mechanism fairly allocates the available bandwidth among ABR connections. Applications are similar to those for UBR. ABR traffic is supplied an MCR and any available bandwidth, while UBR traffic does not require that switches use specified cell rates in negotiating bandwidth.

At all times, but of particular import during periods of congestion, switching priority is given to the "guaranteed" data types, including CBR, VBRrt, VBRnrt, and ABR (but only ABR below the MCR), while UBR and the remaining ABR traffic (above the MCR) gets access only to remaining available ("non-guaranteed") bandwidth after guaranteed connection contracts are fulfilled. When sufficient buffer resources are unavailable, the ATM switch will block pending connections.

Such specific constraints on traffic flow, priority, and timing result in a need for a system which determines how large queues should be allowed to grow (per-connection) within the shared buffer. Queue lengths for delay-sensitive traffic (CBR and VBRrt) should be tightly constrained in order to bound worst-case delay. Conversely, queue lengths for delay-insensitive traffic (VBRnrt, ABR, UBR) should be allowed to grow to be very large, if necessary, in order to maximize throughput while minimizing loss. As such, it is essential that the buffer be partitioned so that some percentage of the shared buffer is always available for arriving cells from connections in guaranteed classes.

There is therefore a need in the art for a method and system of switch buffer management and node control which adheres to the appropriate data traffic priority hierarchy, while efficiently utilizing available buffer space to minimize congestion and provide a high level of adaptivity to changing connection-level loading patterns. There is a further need for such a method and system which can support a user's loss and delay objectives for traffic requiring service guarantees at all times, and provides graceful performance degradation when the device is operating while congested.

SUMMARY OF THE INVENTION

To address the shortcomings of the available art, the present invention provides a switch for providing buffered connections within a computer data network, said switch having a plurality of input ports and at least one output port, the switch comprising: a buffer, storing at least a first data type received at a first input port and a second data type received at a second input port, the first data type having a higher priority level for storage in said buffer than said second data type, and a controller for partitioning said buffer into a first storage area for said first data type and a second storage area for said second data type, wherein said controller can partition said buffer in at least two manners, and where at least one the manners may be static partitioning, at least one of the manners may be adaptive partitioning, or the two manners may be both static partitioning and adaptive partitioning.

The invention further provides, in a switch for completing connections within a computer data network, said switch having a plurality of input ports and at least one output port, a method of buffering a connection, the method comprising the steps of: setting a partition within a data buffer to a first position, the partition dividing storage area in the buffer among a first data type and a second data type and thereby designating a maximum amount of said first data type the buffer can store, measuring the data load of the first data type at a first time, designating a first data type load high-tolerance level relative to the maximum and a first data type load low-tolerance level relative to the data load measured at the first time, measuring the data load of the first data type at a second time, if the data load measured at the second time is at least the load high-tolerance level, adjusting the partition to a second position, thereby increasing the maximum amount of said first data type the buffer can store, and if the data load measured at the second time is less than or equal to the load low-tolerance level, adjusting the partition to a second position, thereby decreasing the maximum amount of said first data type the buffer can store. The invention still further provides a computer implemented system for implementing the steps recited for this method.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 is a block diagram illustrating a partitioned connection buffer.

FIG. 2 is a block diagram illustrating the connection buffer of FIG. 1 divided into a plurality of channels for guaranteed and non-guaranteed data traffic in static mode.

FIGS. 3A and 3B illustrate the adaptive mode of buffer discard management and control of the method and system of the present invention.

Figure 4:
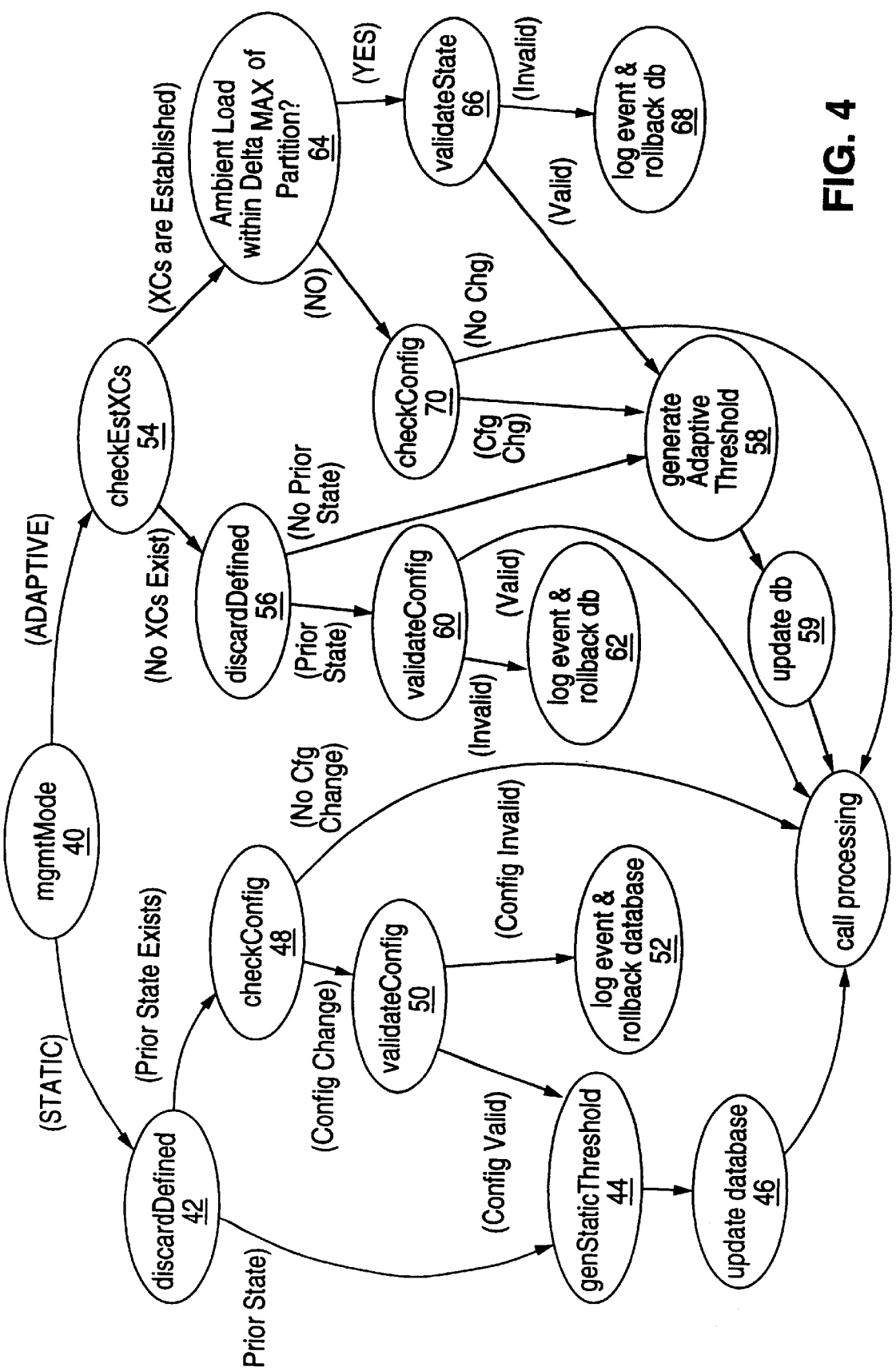
FIG. 4 is a flow diagram, representing a state machine reflecting the performance characteristics of the method of the present invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF A PREFERRED EMBODIMENT

Referring first to the block diagram of FIG. 1, a data buffer 10 is illustrated having a partition boundary 12. As illustrated, area 14 in buffer 10 to the left of boundary 12 is reserved for guaranteed traffic (CBR, VBRrt, and VBRnrt, and some ABR, as explained above), while area 16 is accessible to non-guaranteed UBR and the remaining ABR traffic. The partitioning technique illustrated in FIG. 1 is generally set for high speed connection characteristics based upon expected data flow type and quantity. This technique is referred to herein as static partitioning, wherein the location of boundary 12 and, therefore, the relative sizes of areas 14 and 16, is determined by the network operator and not automatically altered regardless of changes in network data-flow characteristics.

It should be noted here that the user need not place the partition boundary. The system of the present invention will calculate the appropriate position of boundary 12 in a manner based upon operator-configured capacity settings for each traffic type at each port. Thus, each port will have some operator-defined number of different traffic classes at varying percentages of available bandwidth, from which the system of the present invention will calculate the location of partition boundary 12 within shared buffer 10 according to the requested rate and the ingress and egress rates of the relevant port. In an example of operation, if an operator indicates a need for at least ten percent CBR traffic across a port, and the type of port selected provides a certain ingress rate (cells/second) and a particular egress rate, then the system of the present invention will calculate buffered occupancy requirements (and, therefore, the location of the partition boundary) according to the equation:

$$\text{OfferedLoad}_{per\ connection} = (\text{ingressRate} * \text{sharedBufferSize}) / \text{egressRate}.$$

It should be further noted that this equation may be used to estimate the available load for both individual connections and for overall static mode partition boundaries. For background regarding estimates of per-connection and per-class ingress loads for VBRnrt traffic in particular, the reader is referred to Guerin, R., Ahmadi, H., Naghshineh, M. "Equivalent Capacity and Its Application to Bandwidth Allocation in High-Speed Networks." IEEE Journal on Selected Areas of Communications. Vol. 9, No. 7 September, 1991, which is incorporated herein by reference.

Referring next to FIG. 2, an example of use of the static mode partitioning approach is illustrated. As connections are made that exceed the active capacity of the switch, the buffer is utilized and pluralities of virtual channels 24 and 26 are created in each of areas 14 and 16, respectively, each channel reserved to accommodate a connection. As more guaranteed connections through channels 24 consume the available buffer space in area 14, the guaranteed buffer space limit defined by boundary 12 is reached. Once the limit set by boundary 12 is reached, no additional buffer space can be allocated to guaranteed connections, and additional guaranteed connections must be refused. This is the case even if, as shown, there is substantial unused buffer space in non-guaranteed connection buffer area 16. Such inefficient buffer utilization leads to a higher call-blocking probability than optimal and is therefore undesirable.

Despite the apparent shortcomings of static buffer partitioning, there are some desirable qualities, particularly as implemented according to the method and system of the present invention. For example, static partitioning enables a network operator to assure network users that at any time at least a minimum amount of guaranteed connections will be executable across a switch configured for a significant guaranteed-connection buffer. Also, static partitioning is fast, since no switching time need be dedicated to setting partitioning boundaries. There remains, therefore, a need for a scheme that continues to enable operator-defined minimum buffering characteristics, while enabling more efficient buffer utilization to reduce call blocking probability.

To address this need, the present invention provides a second, adaptive buffer management approach, within a switching system providing both static- and adaptive-mode buffer management. Adaptive-mode buffering is illustrated in FIGS. 3A and 3B. As shown in FIG. 3A, instead of the set partition calculated for static mode partitioning, a minimum and a maximum triggering threshold (Thresh$_{min}$ and Thresh$_{max}$ respectively) are first set by the network operator or are set at default levels. By tracking the calculated queue load for each guaranteed connection, the system is able to maintain an estimate of the amount of buffer space (the ambient load) required to support the guarantees. The system then determines whether a shift in the location of the buffer partition is necessary to accommodate additional guaranteed traffic.

Delta$_{min}$ and Delta$_{max}$, used to generate Thresh$_{min}$ and Thresh$_{max}$, are preferably integer values between zero and the buffer size. Delta$_{min}$ is less than or equal to Delta$_{max}$, and denotes a fixed offset below the ambient load which serves as a minimum threshold. If the current ambient load falls below threshold Thresh$_{min}$, (located a distance of Delta$_{min}$ below the ambient measured at the time the partition boundary was last calculated), then the partition is shifted down and the amount of buffer space available for guaranteed connections is reduced, while the amount available for non-guaranteed connections is increased. Similarly, Delta$_{max}$ denotes a fixed offset below the partition location, thereby defining Thresh$_{max}$, as shown. Thus, when the ambient load exceeds Thresh$_{max}$ and approaches the mobile partition 32 (set initially at a point that provides the minimum space required to accommodate all delay-sensitive guaranteed traffic), a shift in the threshold values and partition locations is implemented, and the size of the guaranteed buffer area 34 is expanded, as reflected in FIG. 3B. As the guaranteed buffer area grows, the area available for non-guaranteed ABR and UBR traffic is diminished.

The partition scaling factor set by the operator is represented in FIG. 3B by a scaling Factor. In a preferred embodiment, the magnitudes of Delta$_{min}$, Delta$_{max}$ the scaling Factor are predetermined by a network operator or other user, via an input mechanism not illustrated but which will be understood by those skilled in the art to which the present invention pertains. The scaling Factor is preferably a floating point value between zero and one which denotes a scaling factor used to determine the percentage of buffer space to expand or contract each time the guaranteed partition is modified. When Delta$_{min}$ is the trigger, the new partition is calculated by multiplying the old partition by the quantity (1−Factor). Similarly, when Delta$_{max}$ is the trigger, the new partition is calculated by multiplying the old partition by the quantity (1+Factor), as shown in FIG. 3B.

Through the above-described mechanism, the method and system of the present invention provide a mechanism for tuning the sensitivity of adaptive mode buffer partitioning. Changes in Delta$_{min}$ and Delta$_{max}$ will directly affect the responsiveness of adaptive partitioning, providing an increased or decreased frequency of partition recalculations. Also, an increase in partition calculation frequency will result in a proportional increase in latency caused by changes in partitioning, as explained further below.

In the method and system of the present invention, the network operator preferably selects between static- and adaptive-mode partitioning. If operating in static mode, the system of the present invention verifies that any operator-proposed modification to the partition location does not violate the requirements of existing connections prior to allowing the modification to proceed. If the modifications are accepted by the system, the partitions are updated according to the new configuration, thereby allowing static-mode tuning of buffer utilization to conform to the operator's observed buffer loading patterns, while providing high-speed connection establishment. If operating in adaptive mode, the operator may set three configurable parameters Factor, Delta$_{min}$ and Delta$_{max}$ or rely on default parameters set by the system.

It should be understood that one minor cost associated with the adaptive buffer management of the present invention is the periodic injection of latency into the connection setup path during the setup of those connections which cause the shared buffer partition to be recalculated. However, when such delay is unacceptable, static-mode partitioning remains available as part of the bi-modal system of the present invention.

Referring next to the flow diagram of FIG. 4, the control steps implemented by the system of the present invention are illustrated. It should be noted that the steps illustrated in FIG. 4 are preferably implemented as a state machine, wherein each element of the figure represents a binary flag or bit, which functions according to the illustration. However, the flow of steps illustrated may alternatively be implemented as pure software executed by a processing unit. To better illustrate this equivalence, the diagrams are describes as a series of steps, though those skilled in the pertinent art will understand that each element may just as easily represent a bit set high or low according to the state of the controller.

At mgmtMode step 40, a selection is made between the static and adaptive operating modes described above. If static mode is selected, the system checks for any existing partition parameters at step discardDefined 42. If no such pre-existing parameters are found, per-port configuration data is located and the shared buffer partition calculated as described above at step genStaticProfiles 44. Once the system database is updated at step update database 46, call processing commences.

If, at step 42, existing partition parameters are located, a check is made at step checkConfig 48 to determine whether a configuration change has been made (e.g., a change in the per-port capacity of a port for a particular traffic type) since the last check. If not, call processing commences. If a change is found, the proposed configuration is validated against the requirements of the existing guaranteed traffic load at step validateConfig 50. If a valid configuration is found, call processing commences after steps 44 and 46. If not, at step log event & rollback database 52 the event is logged, the operator notified, the system rolled back to the last valid configuration, and call processing commences.

If adaptive mode is selected at step 40, at step check-EstXCs 54 a check of a call control database is executed to determine whether any cross-connections (other than those used by virtual channels dedicated to network control functions) exist on any ports of the switch line card under examination. If none are found, the system checks for any existing partition parameters at step discardDefined 56. If no such pre-existing parameters are found, per-port configuration data is located and the initial shared buffer state is calculated at step generate Adaptive Threshold 58. If there is a prior state, it is validated at step validateConfig 60 to determine whether the existing state can support the service requirements of existing guaranteed traffic. If so, the database is updated at step 59 and control flow proceeds to the normal call processing. If not, at step log event & rollback database 62 the event is logged, the operator notified, the system rolled back to the last valid configuration, and call processing commences If cross-connections are found on any ports, the current ambient load is examined at step 64 to determine whether it is within Delta$_{max}$ or greater than the existing shared buffer partition boundary. If the current ambient load is above the maximum threshold, then the existing state of the discard subsystem is validated at step 66 to ensure that the semantics conform to those expected in adaptive mode. If the semantics are as expected, then the discard state is regenerated at step 58 to meet the current ambient load requirements for guaranteed traffic. If the semantics are not in line with the adaptive mode requirements, at step 68 the operator is notified, the system rolled back to the last valid configuration, and call processing commences. If the current ambient load does not require that the shared buffer partition boundary be recalculated, then a comparison is made at step 70 of the previous and current configurations for the line card under analysis to determine whether a physical port has been added or deleted. If so, the egress rate of the system has changed and the current state of the discard subsystem must be regenerated at step 58. If the configuration has not changed, then normal processing commences.

The initial states of the static and adaptive mode processing flows and state machines described above with reference to FIG. 4 can be categorized and described as follows.

Static Mode Initial States

Static mode can be started from any of three initial states:
a) Static Mode from Startup When the line card has just been initialized, prior to the establishment of any circuits on the card, and the network operator has selected the Static Mode of shared buffer management, the controller is in a startup state. When this state is detected, the discard subsystem state generated by the controller will reflect the existing configuration of the physical ports on the line card. These port configurations may be either factory default values or operator-specified values, reflecting the traffic mixture anticipated by the network operator.

b) Static Mode Toggled from Adaptive Mode

At anytime during the operation of the switch, the network operator can reset a 'mgmtMode' bit, notifying the controller that static mode buffer management is preferred. This affords the operator the ability to "freeze" the shared buffer partition and associated per-connection buffer thresholds which had previously been adapting to changing load patterns via the Adaptive Mode mechanism. It should be noted that when operating in this state, the device is configured for static mode, but the state of the discard subsystem has no correlation with the port settings (which may or may not be configured). This state is largely useful in debugging network-related performance issues.

c) Reassertion of Static Mode from Static Mode

This state allows the network operator to regenerate the discard subsystem state in cases where the egress rate characteristics of the line card have been modified (as in adding or deleting a physical port). Thus, when this state is detected, the subsequently generated discard subsystem is based on the current port and line card configuration. It should be noted that when operating in static mode, the values of the Factor, DELTA$_{min}$, and DELTA$_{max}$ parameters are not relevant.

Adaptive Mode Initial States

Like static mode, adaptive mode can be triggered from three initial states:

d) Adaptive Mode from Startup

Adaptive mode can be initiated with no prior state existing on the switch. In such a case, the initial shared buffer partition boundary will be set such that only space for delay-sensitive traffic (CBR, VBRrt) will be pre-allocated. The amount of cell buffer locations reserved will vary as a function of the egress rate of the line card, but is should be noted that in all cases this value is on the order of several hundred cell locations. This will allow non-guaranteed traffic to gather virtually the entire shared buffer space in scenarios where there are no connections established from delay insensitive guaranteed classes (VBRnrt and ABR).

e) Adaptive Mode Toggled from Static Mode

In this state, the initial configuration settings used will be those previously generated for static mode, derived from the previous port settings. In effect, this mode provides network operators the ability to begin operation of the line card using a pre-defined discard state (static mode) and subsequently migrate to adaptive behavior.

f) Reassertion of Adaptive Mode from Adaptive Mode

As with the analogous state in static mode, this state provides the network operator with a mechanism that will force the discard subsystem state to be regenerated should the egress rate characteristics of a line card be modified while traffic is traversing other ports on the line card. In this state, the discard state is recalculated by the controller based on the ambient load conditions.

It should be noted that the presently preferred default settings are as shown below. These values may be changed, as additional experience is gained with the method and system of the present invention.

| Parameter | Value | Units |
|---|---|---|
| STATIC MODE: | N/A | |
| Factor | 0.25 | (scalar) |
| $Delta_{min}$ | 2500 | (cells/sec) |
| $Delta_{max}$ | 5000 | (cells/sec) |

The present invention therefore provides a novel method and system for bi-modal partitioning of a shared output buffer in a connection-oriented network connections device. Although the present invention has been shown and described with respect to preferred embodiments, various changes and modifications lie within the spirit and scope of the claimed invention. Thus, the corresponding structures, materials, acts, and equivalents of all means or step plus function elements in the claims are intended to include any structure, material, or acts for performing the functions in combination with other elements as specifically claimed.

What is claimed is:

1. In a switch for completing connections within a computer data network, said switch having a plurality of input ports and at least one output port, a method of buffering a connection, the method comprising the steps of:

setting a partition within a shared output data buffer to a first position, the partition dividing storage area in the shared output buffer among a guaranteed data type and a non-guaranteed data type and thereby designating a maximum amount of the guaranteed data type the shared output buffer can store;

estimating the ambient load of the guaranteed data type at a first connection establishment time, using the traffic parameters provided along with the connection setup request to calculate the estimated load on the shared output buffer;

designating a guaranteed data type load high-tolerance level relative to the maximum and a guaranteed data type load low-tolerance level relative to the ambient load estimated at the first time;

estimating the ambient load of the guaranteed data type at a second time as additional connections are subsequently added or deleted; and if the ambient load estimated at the second time is at least the load high-tolerance level, adjusting the partition to a second position, thereby decreasing the maximum amount of the non-guaranteed data type the shared output buffer can store;

if the ambient load estimated at the second time is less than or equal to the load low-tolerance level, adjusting the partition to a third position, thereby increasing the maximum amount of the non-guaranteed data type the shared output buffer can store.

2. A switch for providing buffered connections within a computer data network, the switch having a plurality of input ports and at least one output port, the switch comprising:

a shared output buffer for storing both time sensitive guaranteed data traffic and non-time sensitive non-guaranteed data traffic;

a controller for operating the switch in both the static and adaptive partitioning modes of operation by partitioning the shared output buffer into a first portion for guaranteed data and a second portion for non-guaranteed data; and wherein the controller shifts the position of partition, based upon estimates of shared output buffer space required to support the guaranteed data, to increase the size of the portion for the guaranteed data to accommodate additional guaranteed data traffic and to decrease the size of the portion to accommodate less guaranteed data traffic.

* * * * *